United States Patent [19]
Reinert

[11] Patent Number: 5,890,425
[45] Date of Patent: Apr. 6, 1999

[54] SCRAP TIRE COLLECTION, VOLUME REDUCTION, AND TRANSPORTATION

[76] Inventor: Gary L Reinert, 4319 Middle Rd., Allison Park, Pa. 15101

[21] Appl. No.: 778,178

[22] Filed: Jan. 10, 1997

Related U.S. Application Data

[60] Provisional application No. 60/009,892, Jan. 11, 1996.

[51] Int. Cl.⁶ .................................. B30B 9/30; B30B 9/32
[52] U.S. Cl. .......................... 100/39; 52/DIG. 9; 100/97; 100/100; 100/102; 100/137; 414/786; 428/2; 428/903.3
[58] Field of Search .................................. 100/35, 39, 97, 100/100, 102, 137, 232, 299; 52/DIG. 9; 157/1.21, 2; 405/129; 414/111, 786; 428/2, 903.3

[56] References Cited

U.S. PATENT DOCUMENTS

| | | | |
|---|---|---|---|
| 3,180,249 | 4/1965 | Patros | 100/39 |
| 3,438,319 | 4/1969 | Raab | 100/35 |
| 3,467,001 | 9/1969 | Balbi | 100/100 |
| 3,557,683 | 1/1971 | Boyd | 100/100 |
| 3,557,685 | 1/1971 | Schroering | 100/39 |
| 3,583,164 | 6/1971 | Sherrill | 100/100 |
| 3,913,850 | 10/1975 | Daniel . | |
| 4,022,434 | 5/1977 | Moore | 52/DIG. 9 |
| 4,925,113 | 5/1990 | Wissman et al. . | |
| 4,995,780 | 2/1991 | Dietzler | 414/111 |
| 5,172,528 | 12/1992 | Clarke | 52/DIG. 9 |
| 5,375,775 | 12/1994 | Keller et al. . | |
| 5,395,061 | 3/1995 | Merklinger . | |
| 5,590,594 | 1/1997 | Pederson | 100/100 |

*Primary Examiner*—Stephen F. Gerrity
*Attorney, Agent, or Firm*—Douglas G. Glantz

[57] ABSTRACT

A method of handling scrap tires is disclosed, including providing a satellite tire collection enclosure constructed of baled tires and sized to receive at least about 2400 scrap tires, collecting scrap tires inside the tire collection enclosure until the enclosure is at or near capacity, volume reducing the scrap tires by baling the scrap tires using a mobile tire baler having a baler and a boom on a mobile platform at a minimum of about 2,400 whole tires into about 24 bales to achieve a volume reduction of about 80 percent by volume, and transporting baled scrap tires to a home base, a recycling center, or directly to an end-user. In one aspect, a mobile tire baler includes a baler and a boom on a mobile platform, a cutter for over-size tires, and a crusher for tire rims.

11 Claims, No Drawings

SCRAP TIRE COLLECTION, VOLUME REDUCTION, AND TRANSPORTATION

This patent application claims the benefit of Provisional application Ser. No. 60/009,892, filed Jan. 11, 1996.

BACKGROUND OF THE INVENTION

1. Field of the Invention

This invention relates to the collection, volume reduction, and transportation of scrap tires.

2. Background

Conventionally, scrap tire recyclers haul a tire collection trailer to a scrap tire collection site and park it there for so long as it takes for scrap tires to accumulate in an amount sufficient to fill the trailer with tires. A tractor is needed to haul the tire collection trailer from the scrap tire collection facility, to haul on to the customer, and then to haul the trailer from that location to another location and back to the recycling facility.

INTRODUCTION TO THE INVENTION

Scrap tire recyclers typically park a tire collection trailer at the scrap tire collection site, usually until it is full, and a tractor is needed then to come along and haul the trailer from that location to another location for further processing. For each tractor and trailer, expensive costs are involved, e.g., such as insurance, license, equipment ownership (capital), depreciation, maintenance, operating expenses, and primarily the transportation cost associated with the limited weight or volume of tires which can be placed on a conventional trailer/container.

The full trailer, having 1,000 to 1,250 tires loaded in the trailer, must be taken back to a Recycling Facility and/or Home Base. Only about 1,000 to 1,250 scrap tires can be hauled in the trailer loose, i.e., loosely assembled in the trailer.

For each tractor and trailer, expensive costs are involved, e.g., such as insurance, license, equipment ownership (capital), depreciation, maintenance, operating expenses, and primarily the transportation cost associated with the limited weight or volume of tires which can be placed on a conventional trailer/container.

For efficiency and in order to justify the transportation cost associated with scrap tires, it is important to reduce these costs, which are critical to achieve a break even operation in the scrap tire recycling industry.

Once at the Processing Center/Facility which is equipped with loading/unloading docks, the trailer is unloaded. Unloading is accomplished via a machine in an area where the trailer can unload to a loading dock platform with a skid loader to extract the tires from the trailer. Otherwise, the trailer must be unloaded by hand. The unloading thereby is identified as another transportation cost.

In the conventional operation, a tractor delivers an empty trailer to the customer's location and returns a full trailer, thus, requiring two trips. For every customer, the conventional operation requires two trailers and four trips by the tractor. The tractor drops a second trailer off empty and then takes the first trailer back full on the same round trip, so as not to require the tractor and driver to wait for the amount of tires to collect at that center to fill the trailer. Thereby, two trailers are needed in the conventional operation.

Moreover, for every customer, the conventional operation requires two trailers which are entirely road-worthy. So the conventional operation requires insurance, license, equipment ownership (capital), depreciation, maintenance, and operating expenses for two road-worthy trailers.

The scrap tire collector then provides for the processing of the tires at the processing center. The scrap tire collector runs the tires through a shredder or chipper or other means of processing.

It is an object of the present invention to provide a novel scrap tire collection process.

It is an object of the present invention to provide a novel scrap tire collection process to reduce transportation costs in the collection and distribution of scrap tires.

It is an object of the present invention to provide a novel scrap tire collection process to reduce equipment capital and maintenance costs in the collection and distribution of scrap tires.

Yet another object of this invention is to provide a novel scrap tire collection process to reduce manpower and labor costs in the collection and distribution of scrap tires.

A further object of this invention is to provide a novel scrap tire collection process which obtains one or more of the objects and advantages set forth above.

A further object of this invention is to provide a novel scrap tire collection process which eliminates or reduces the problems associated with conventional scrap tire collection methods.

These and other objects of the present invention will become apparent to those skilled in the art from a careful review of the detailed description which follows.

SUMMARY OF THE INVENTION

The present invention provides a method of handling scrap tires including a satellite tire collection enclosure, in one aspect constructed of baled tires, sized to receive at least about 2400 scrap tires, collecting scrap tires inside the tire collection enclosure until the enclosure is at or near capacity, volume reducing the scrap tires by baling the scrap tires using a mobile tire baler having a baler and a boom on a mobile platform at a minimum of about 2,400 whole tires into about 24 bales, and transporting baled scrap tires to a home base, a recycling center, or directly to an end-user. In one aspect, a mobile tire baler includes a baler and a boom on a mobile platform, a cutter for over-size tires, and a crusher for tire rims.

DETAILED DESCRIPTION

In accordance with the present invention, a scrap tire collector working in combination with a scrap tire generator, e.g., such as in a contract or agreement with each scrap tire owner/supplier, provides an enclosure constructed of baled tires. This enclosure is sized to allow a substantial amount of scrap tires to be collected for eventual processing on-site. The scrap tire collector provides for the processing of all scrap tires for the term of the contract, e.g., such as over a period of 3 to 5 years.

At the location of the enclosure, which is typically a tire generator (which is also described as a Satellite), tires are placed inside the enclosure until' such time that the enclosure is at capacity and a baling crew is assigned to mobilize the site and bale at a level of about 2,500 whole tires or 25 bales. The volume reduction (baling) process reduces the cost of storage and eliminates the need for a conventional trailer/container, loading of the trailer by hand, unloading loose tires at the final destination, and the four trips required by the tractor. All work can be completed with two trips utilizing this process.

The scrap tire collector then provides routinely for the on-site processing and pick-up of the processed scrap tires from each scrap tire owner/supplier location and for the hauling to a Satellite or Home Base.

A Satellite Processing Center is often located in outlying areas separated from the Home Base or main staging area. These Satellites are located within 25 miles of particular customers in established areas. Satellites are situated in areas of high tire concentrations and positioned within 50 to 100 miles of a Home Base or End-User.

At the Satellite, the scrap tires from many scrap tire suppliers are processed into bales. Tires are processed at these specified locations for transport to the Home Base directly to the End-User or staged at the Home Base. This Satellite location could be at a landfill, a piece of property, or simply a location where tires are generated.

The scrap tire collector loads the processed 25 bales onto the trailer and transports the trailer to the Home Base, Recycling Center, or directly to the End-User. There, the bales are unloaded by means of a front loader equipped with forks or other apparatus that may handle the weight of a bale which in this case is 2,000 to 3,000 pounds each. Home bases are located within a 50 to 100 mile radius of Satellite locations and are capable of storing or staging large quantities of processed tires.

By baling the scrap tires, a substantial volume reduction is achieved, e.g., such as by approximately 80 percent by volume, which allows for transporting a greater number of scrap tires by means of trucks, rail, or barge.

From the Satellite, bales may be taken directly to the nearest rail or barge site and shipped to end-users or staged at a Home Base. Alternatively, the bales are taken to the nearest river site and shipped by river barge to the end users.

If the owner/supplier has a Satellite location, the scrap tire collector then provides for the processing of scrap tires at the scrap tire supplier location. This type of scrap tire supplier can stock up to about 10,000 to 20,000 scrap tires on-site within a simple bale enclosure.

Preferably, the scrap tire collection enclosures are constructed from baled tires. Alternatively, a fenced-in area may be provided at the customer's request and may involve an estimated cost of about $1,000.00 to $1,500.00. Such a cost is only a one time cost, and does not involve costs for a tractor, for insurance, or maintenance for fixing trailers up to be road-worthy. Such cost is a one time investment and does not involve the cost of a tractor, insurance, or maintenance for typical repairs and maintenance required to maintain road-worthy trailers.

The scrap tire collector then provides for removing and transporting the baled tires. Once the scrap whole tires have been baled, the tractor trailer can be loaded with baled tires, but now the tractor trailer can haul 2400 tires, as compared to the 1,200 tires under to conventional technique, which is about twice as many because of the volume reduction techniques utilized for the processing of scrap tires. Subsequently, the trailer may be hauled back to the Home Base or to the processing center or end-user.

Tires are collected, processed, and transported to a Home Base which is located at a barge or railroad siding for the purpose of transporting in volume. There, the processed tires are loaded on a barge for shipping on the river to the destination or end user or simply staged for future off-site use.

A novel baler truck is provided having a baler mounted on the truck, a boom, a portable cutter for cutting oversize tires, and a portable crusher for crushing tire rims. Some tires, because of different, inconsistent sizes, must be cut in half or in quarters to go into the baler. Tires having rims on them require a crushing unit operation for crushing the rims. The truck requires only one hydraulic system in combination with a switchable control selectable as to the unit operation on the novel truck. Otherwise, e.g., in prior art operations before the novel baler truck of the present invention, each independent baling, cutting, or crushing operation would come with its own motor, a pump, and hydraulic system. The novel baler truck of the present invention provides all unit operations on one truck because the baling unit operation has the largest capacity of hydraulic systems, more than the cutting and crushing unit operations system.

The single hydraulic system on the novel baler truck of the present invention is controllably switchable from the baler to the crusher, to the cutter, or to the boom. All unit operations thereby use the same hydraulic system for all unit operations on the novel baler truck of the present invention and for the process of the present invention to operate to reduce problems associated with used tires, including, reducing fire hazard by reducing the availability of oxygen for combustion. Chips of tires have a high flammability risk not similarly associated with the tire bales of the present invention.

The tire novel baler can take 100 to 110 tires and put them into a five feet by five feet by three feet six inches compact bale. The compact bale is so compact as to prevent water from entering the bale or tires in the bale. Loose tires have a severe problem with water laying in them. Insects invade the loose tires having such water present. The tire bale thereby provides for a significant reduction in insects or rodents.

The scrap tire collector provides for the processing of the scrap tires in accordance with the present invention by contracting with the scrap tire owner/supplier, e.g., in obtaining a Guarantee from this type of scrap tire owner/supplier to come to the scrap tire site and pick-up all scrap tires, on a routine, long term basis.

The scrap tire collector provides for the processing of the scrap tires in accordance with the present invention by using a flat-bed truck with a baler and a boom crane mounted on it. The scrap tire collector provides for the processing of the scrap tires in accordance with the present invention by taking the flat-bed truck with the baler to the scrap tire supplier's site and baling all the stocked tires at the scrap tire supplier's site.

The scrap tire collector provides for the processing of the scrap tires in accordance with the present invention by loading the bales on the flat-bed truck, by means of the on-board boom crane.

The scrap tire collector then drives the flat-bed truck with the bales to a central point, where a forty feet long trailer is located. This forty feet long trailer is centrally located, within a five to ten mile radius of the farthest scrap tire stock pile suppliers. The scrap tire collector then provides for the processing of the scrap tires in accordance with the present invention by transferring the bales to the forty feet long trailer. When the trailer is full, the scrap tire collector provides for the processing of the scrap tires in accordance with the present invention by transporting it to the end user site final destination by truck, rail, or river barge.

Although the invention has been illustrated by the preceding detailed description, it is not intended to be construed as being limited to the specific preferred embodiments employed therein.

Modifications, changes, and improvements to the preferred forms of the invention herein disclosed, described, and illustrated may occur to those skilled in the art who come to understand the principles and precepts thereof. Accordingly, the scope of the patent to be issued hereon should not be limited to the particular embodiments of the invention set forth herein, but rather should be defined by the advance by which the invention has promoted the art.

Whereas particular embodiments of the invention have been described hereinabove, for purposes of illustration, it will be evident to those skilled in the art that numerous variations of the details may be made without departing from the invention as defined in the appended claims.

What is claimed is:

1. A method of handling scrap tires, comprising:
   (a) providing a satellite tire collection enclosure sized to receive at least about 2400 scrap tires;
   (b) collecting scrap tires inside said tire collection enclosure until said enclosure is at or near capacity;
   (c) volume reducing said scrap tires by baling said scrap tires at a minimum of about 2,400 whole tires into about 24 bales; and
   (d) transporting baled scrap tires to a home base, a recycling center, or directly to an end-user.

2. A method of handling scrap tires as set forth in claim 1, wherein said tire collection enclosure is constructed of baled tires.

3. A method of handling scrap tires as set forth in claim 1, wherein said tire collection enclosure is a fenced-in area.

4. A method of handling scrap tires as set forth in claim 1, further comprising:
   (e) unloading said baled scrap tires at said home base, recycling center, or end-user by means of a front loader equipped with forks for handling the weight of a bale of about 2,000 to 3,000 pounds.

5. A method of handling scrap tires as set forth in claim 1, wherein said volume reducing said scrap tires by baling said scrap tires comprises a volume reduction of about 80 percent by volume.

6. A method of handling scrap tires as set forth in claim 1, wherein said transporting baled scrap tires comprises transporting by means of truck, rail, or barge.

7. A method of handling scrap tires as set forth in claim 1, wherein said satellite tire collection enclosure is sized to receive at least about 10,000 scrap tires.

8. A method of handling scrap tires as set forth in claim 1, wherein said home base comprises a barge or railroad siding for the purpose of transporting in volume.

9. A method of handling scrap tires as set forth in claim 1, comprising using a mobile tire baler having a baler and a boom on a mobile platform.

10. A method of handling scrap tires as set forth in claim 9, wherein said mobile tire baler has a portable cutter on said mobile platform for cutting oversize tires and a portable crusher for crushing tire rims.

11. A method of handling scrap tires, comprising:
    (a) providing a satellite tire collection enclosure constructed of baled tires and sized to receive at least about 2400 scrap tires;
    (b) collecting scrap tires inside said tire collection enclosure until said enclosure is at or near capacity;
    (c) volume reducing said scrap tires by baling said scrap tires using a mobile tire baler having a baler and a boom on a mobile platform at a minimum of about 2,400 whole tires into about 24 bales to achieve a volume reduction of about 80 percent by volume;
    (d) transporting baled scrap tires to a home base, a recycling center, or directly to an end-user; and
    (e) unloading said baled scrap tires at said home base, recycling center, or end-user by means of a front loader equipped with forks for handling the weight of a bale of about 2,000 to 3,000 pounds.

* * * * *